United States Patent [19]

Matsueda et al.

[11] Patent Number: 5,105,417
[45] Date of Patent: Apr. 14, 1992

[54] APPARATUS FOR REPRODUCING INFORMATION OUT OF OPTICAL RECORD MEDIUM

[75] Inventors: Akira Matsueda, Hachioji; Isamu Misawa, Okaya, both of Japan

[73] Assignee: Olympus Optical Co., Ltd., Tokyo, Japan

[21] Appl. No.: 620,762

[22] Filed: Dec. 3, 1990

[30] Foreign Application Priority Data

Dec. 4, 1989 [JP] Japan .................. 1-313397

[51] Int. Cl.$^5$ .............................. G11B 7/00
[52] U.S. Cl. ...................... 369/124; 369/59; 369/109
[58] Field of Search ............ 369/124, 109, 44.37, 369/44.41, 44.38, 44.25; 356/392, 394, 398; 235/454; 365/122, 215; 250/201.5, 124, 59, 110, 100

[56] References Cited

U.S. PATENT DOCUMENTS

| | | | |
|---|---|---|---|
| 3,876,841 | 4/1975 | Kramer | 369/44.37 X |
| 4,475,183 | 8/1984 | Marchant | 369/109 X |
| 4,660,191 | 4/1987 | Maeda et al. | 369/44.41 X |
| 4,797,872 | 1/1989 | Rokutan | 235/454 X |
| 4,881,215 | 11/1989 | Horie | 235/454 X |

FOREIGN PATENT DOCUMENTS 52-151513 12/1977 Japan .
61-16070 1/1986 Japan .

Primary Examiner—Roy N. Envall, Jr.
Assistant Examiner—Thang V. Tran
Attorney, Agent, or Firm—Stevens, Davis, Miller & Mosher

[57] ABSTRACT

In an apparatus for reproducing digital information recorded on a track in an optical record medium as discrete record portions representing bit "1" signals in the digital information, main and sub-reading light beams are projected on the optical record medium such that the sub-reading light beam is situated on the same track as that on which the main reading light beam is situated, but is shifted forwardly with respect to the main reading light beam relative to the scanning direction. The main and sub-reading light beams reflected by the optical record medium are photo-electrically converted into main and sub-reproduced signals, respectively. Peaks of the sub-reproduced signal are detected to derive a peak signal, and then the amplitude and offset of the peak signal are adjusted to produce a threshold signal. Alternatively, an average of the sub-reproduced signal is detected to derive an average value signal and the amplitude and offset of the average signal are adjusted to produce a threshold signal. The main and sub-reproduced signals are supplied to a voltage comparator to derive a bivalent signal which represents the recorded digital information.

7 Claims, 5 Drawing Sheets

PRIOR ART
FIG. 2A Reproduced Signal
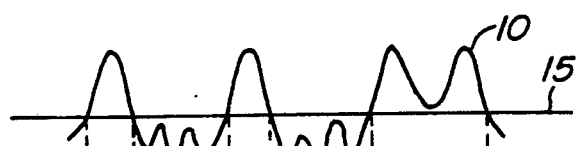
FIG. 2B Differential Signal
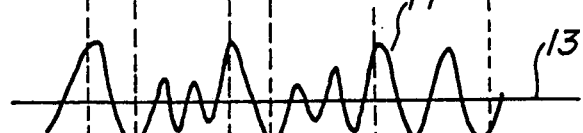
FIG. 2C Zero Cross Signal
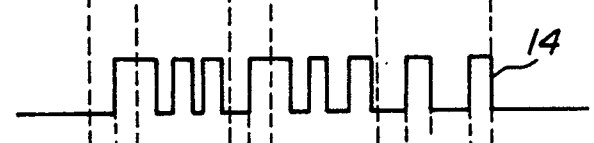
FIG. 2D Gate Signal
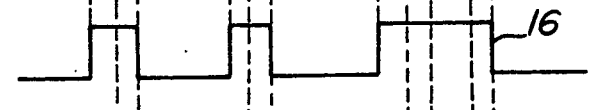
FIG. 2E Bivalent Signal
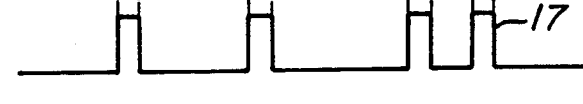

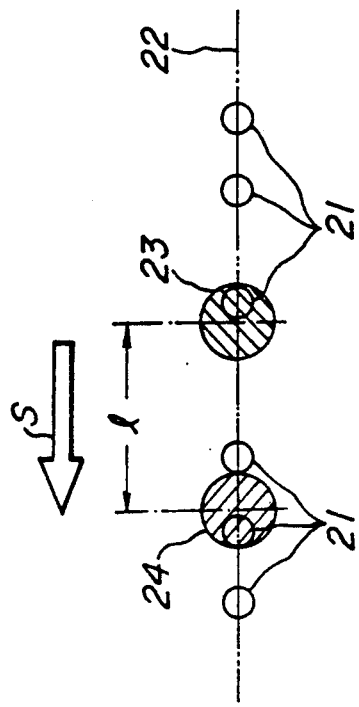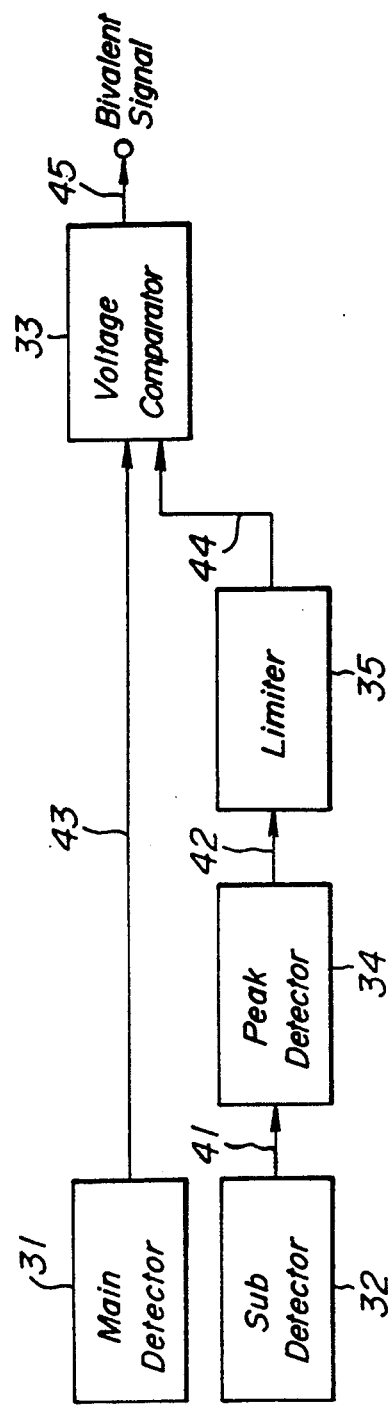

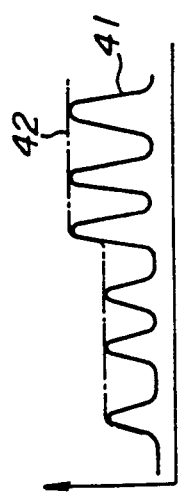
FIG._5A
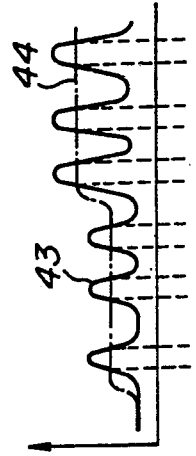
FIG._5B
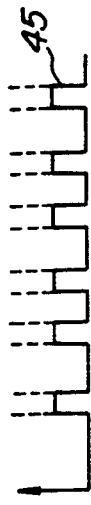
FIG._5C
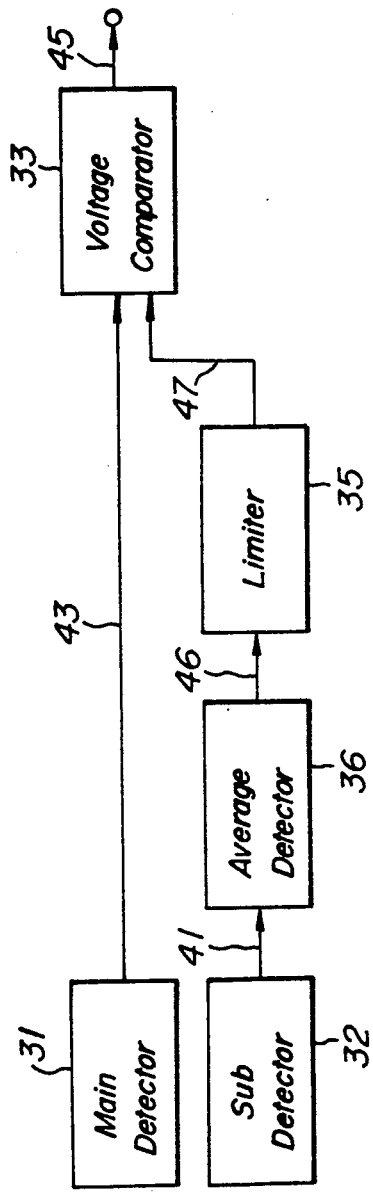
FIG._6

APPARATUS FOR REPRODUCING INFORMATION OUT OF OPTICAL RECORD MEDIUM

BACKGROUND OF THE INVENTION

1. Field Invention and Related Art Statement

The present invention relates to an apparatus for reproducing digital information out of an optical record medium, and more particularly to an apparatus for reproducing digital information recorded on tracks in an optical record medium as discrete record portions representing bits of the digital information.

In an apparatus for reading digital information recorded on an optical record medium such as an optical disk and an optical card, a signal read out of the optical record medium has to be converted into a bivalent signal. Heretofore, in Japanese Patent Application Publication Kokai Sho 61-16070, there has been disclosed a bivalent circuit for converting the read out signal into the bivalent signal. FIG. 1 shows a block diagram depicting such a known bivalent circuit. As illustrated in FIG. 1, the bivalent signal is constructed such that the reproduced signal read out of the optically readable record medium in which only the bit "1" signal of the digital information is recorded as discrete record portions is converted into the bivalent signal by processing the reproduced signal in a manner explained below. The bivalent circuit comprises differentiating circuit 1, zero cross detector 2, bivalent signal generator 3 and gate signal generator 4.

In the known bivalent circuit shown in FIG. 1, a reproduced signal 10 (FIG. 2A) read out of the optical record medium is supplied to the differentiating circuit 1 to derive a differential signal 11 shown in FIG. 2B. The differential signal 11 is then supplied to the zero cross detector 2 to derive a zero cross signal 14 illustrated in FIG. 2C. As depicted in FIG. 2C, since the reproduced signal contains noise 12, the zero cross signal 14 also includes noise components.

The zero cross detector 2 produces the pulse signal 14 whose state is inverted each time the differential signal 11 crosses the zero potential level 13. The thus produced pulsate zero cross signal 14 is supplied to one input terminal of the bivalent signal generator 3.

The reproduced signal 10 is also supplied to the gate signal generator 4 to derive a gate signal 16 (FIG. 2D) which is in a high level (H) when the reproduced signal is equal to or higher than a reference level 15, and is in a low level (L) when the reproduced signal is lower than the reference level 15. The thus generated gate signal 17 is supplied to the other input terminal of the bivalent signal generator 3.

In the bivalent signal generator 3, a logical operation is performed, i.e., a logical AND between the pulse signal 14 supplied from the zero cross detector 2 and the gate signal 16 supplied from the gate signal generator 4. Therefore it is possible to derive the bivalent signal which represents the digital information recorded in the optical record medium as illustrated in FIG. 2E. That is to say, only peaks of the reproduced signal 10 which exceed the reference level 15 can be detected as the real peaks, so that the noise 12 contained in the reproduced signal 10 can be removed. In this manner the bivalent signal generator 3 produces the bivalent signal 17 illustrated in FIG. 2E.

In another known bivalent circuit, instead of setting the reference level 15 for the reproduced signal 10, a reference level is set for the differential signal 11 to detect whether the recorded information is present or not and, only when the recorded information is detected is the reproduced signal converted into the bivalent signal.

In the known bivalent circuit shown in FIG. 1 in which the reference level is set for the reproduced signal 10, it is very difficult to determine the reference level in the optimum manner, because the level of the reproduced signal changes at respective points on the record medium in accordance with the construction and various properties of the optical record medium, so that the bivalent signal could not be obtained correctly.

In order to remove the above mentioned drawback, the reproduced signal is supplied to one input terminal of a voltage comparator as well as to a low pass filter, and an output signal of the low pass filter is supplied to the other input terminal of the voltage comparator as a threshold level signal. Then an output signal of the voltage comparator is supplied to the bivalent signal generator as the gate signal. However, in such a case, the threshold level signal is delayed with respect to the reproduced signal due to the time constant of the low pass filter, so that when the reproduced signal varies greatly it is impossible to derive the threshold level signal properly and thus there is produced an error in the conversion into the bivalent signal.

In the known bivalent circuit in which the reference level is set for the differential signal, since the noise component contained in the reproduced signal is enhanced, the reproduced signal could not be converted into the bivalent signal faithfully.

SUMMARY OF THE INVENTION

The present invention has for its object to provide a novel and useful apparatus for reproducing digital information out of an optical record medium in such a manner that the conversion into the bivalent signal can always be effected correctly.

According to the invention, an apparatus for reading digital information recorded on a track in an optical record medium as discrete record portions comprises:

light projecting means for projecting on the optical record medium a main reading light beam and a sub-reading light beam, said sub-reading light beam being situated on the same track on the optical record medium as that on which said main reading light beam is situated, but being shifted forwardly with respect to the main reading light beam relative to a scanning direction;

photoelectric converting means for receiving the main reading light beam reflected from the optical record medium to generate a main reproduced signal and receiving the sub-reading light beam to produce a sub-reproduced signal;

threshold signal producing means for receiving the sub-reproduced signal to derive a threshold signal which is varied in accordance with the sub-reproduced signal; and converting means for converting the main reproduced signal into a bivalent signal by using the threshold signal as a reference signal.

BRIEF DESCRIPTION OF THE DRAWINGS

FIGS. 2A to 2E are signal waveforms for explaining the operation of the bivalent circuit shown in FIG. 1;

FIG. 3 is a schematic plan view illustrating the positional relationship between the main and sub light beam spots and the recorded bits in the apparatus according to the invention;

FIG. 4 is a block diagram depicting an embodiment of the apparatus according to the invention;

FIG. 5A to 5C are signal waveforms for explaining the operation of the apparatus illustrated in FIG. 4;

FIG. 6 is a block diagram showing another embodiment of the apparatus according to the invention;

DESCRIPTION OF THE PREFERRED EMBODIMENTS

Figure 1:
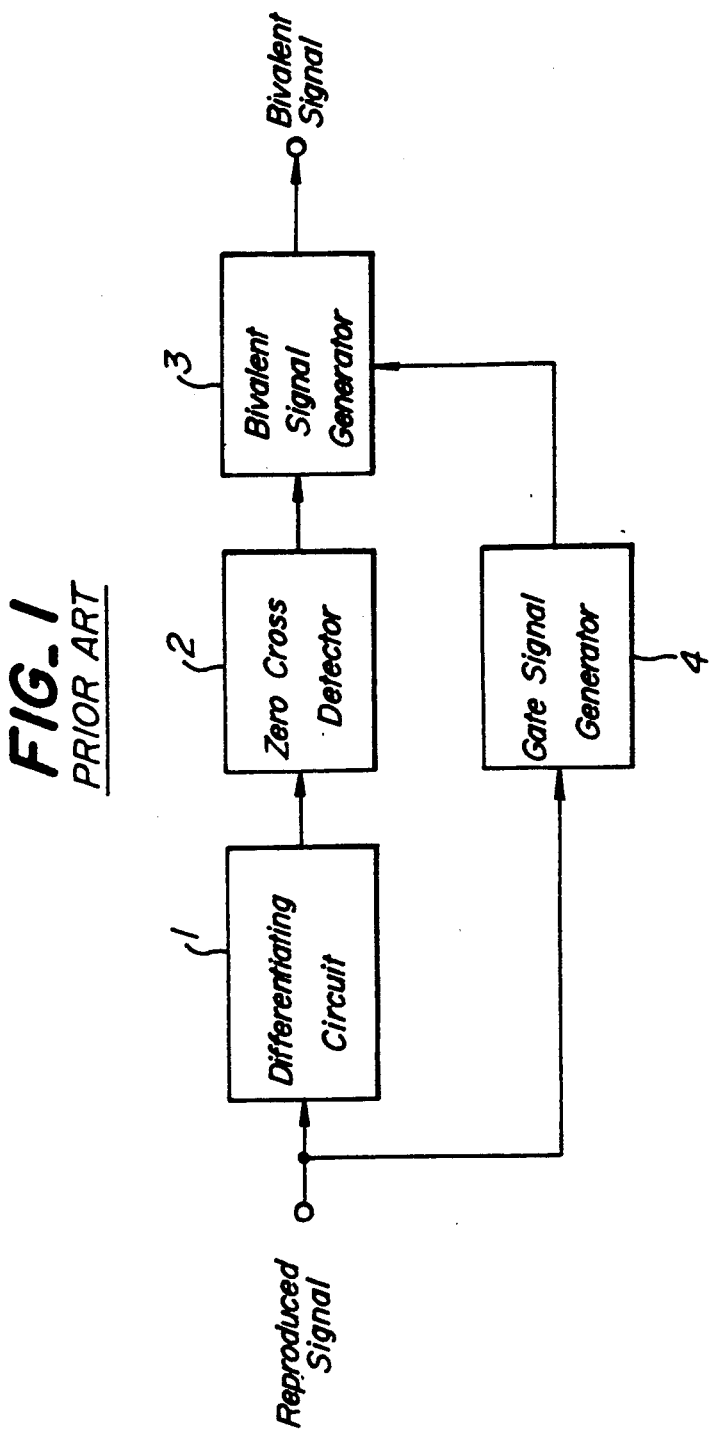
FIG. 1 is a block diagram showing a known bivalent circuit.

As illustrated in FIG. 3, in an optical record medium digital information is recorded as discrete record portions 21 along a track 22, said record portions representing digital bit ∫1". According to the invention, main reading light spot 23 and sub-reading light spot 24 are projected on an optical record medium in a manner such that the sub-reading light spot 24 is situated on the same track 22 as that on which the main reading light spot is situated, but is shifted forwardly with respect to the main reading light spot 23 relative to the scanning direction shown by an arrow S. It should be noted that in FIG. 3 the main and sub-reading light spots 23 and 24 as well as the record portions 21 are illustrated schematically, so that the size of the light spots and record portions and a distance 1 between the main and sub-reading light spots are not limited to those shown in FIG. 3.

According to the invention the track is scanned by the main and sub-reading light spots 23 and 24 while the positional relationship of these light spots is unchanged, and light beams reflected from the optical record medium are received and are photoelectrically converted into electrical signals. Then it is possible to derive main and sub-reproduced signals which are similar to each other, but are shifted from each other by a time corresponding to the distance 1.

According to the invention the sub-reproduced signal derived from the proceeding sub-reading light spot 24 is processed to derive a threshold signal. For instance the threshold signal may be obtained by averaging the sub-reproduced signal. Then the main reproduced signal is processed by using the threshold signal as a reference level signal to derive a bivalent signal.

When the main reproduced signal level is changed due to various factors such as the variation in the light intensity and dust on the record medium, the sub-reproduced signal level is also changed correspondingly. Therefore the variations in the level of these reproduced signals are canceled out, so that it is possible to convert the reproduced signal into the bivalent signal always faithfully and stably.

FIG. 4 is a block diagram showing an embodiment of the apparatus according to the invention. In the present embodiment, the threshold signal is derived in accordance with the peak values of the sub-reproduced signal. The main light beam reflected by the record medium is received by a main photodetector 31 to derive a main reproduced signal 43 and the sub-light beam reflected from the record medium is received by a sub-photodetector 32 to derive a sub-reproduced signal 41.

The main reproduced signal 42 produced by the main photodetector 31 is applied to one input terminal of a voltage comparator 33. The sub-reproduced signal 41 is supplied to a peak detector 34.

In the peak detector 34 the peak values of the sub-reproduced signal are detected and held and a peak signal 42 is derived. The peak signal 42 is then applied to a limiter 35 which processes the peak signal to derive a threshold signal 44. The threshold signal 44 is then applied to the other input terminal of the voltage comparator 33.

In the present embodiment, the peak detector 34 produces the peak signal 42 by detecting successive peaks of the sub-reproduced signal 41 as illustrated in FIG. 5A. In the limiter 35 the amplitude and offset of the peak signal are suitably adjusted to derive the threshold signal 44, and in the voltage comparator 33 the main reproduced signal 43 is compared with the threshold signal as shown in FIG. 5B to derive the bivalent signal 45 shown in FIG. 5C. According to the invention since the level of the threshold signal 44 is changed in accordance with the level of the main reproduced signal, it is possible to obtain the bivalent signal which represents the digital information faithfully. That is to say, the high level of the bivalent signal correctly represents the digital "1" bit.

FIG. 6 is a block diagram illustrating another embodiment of the apparatus according to the invention. In this embodiment the threshold signal is derived in accordance with the average value of the sub-reproduced signal. To this end, the sub-reproduced signal 41 produced by the sub-photodetector 32 is applied to an average value detector 36 to derive an average value signal 46 which is then applied to the limiter 35 to derive a threshold signal 47. In the voltage comparator 33 the main reproduced signal 43 is compared with the threshold signal 47 to derive the bivalent signal 45.

Figure 7A:
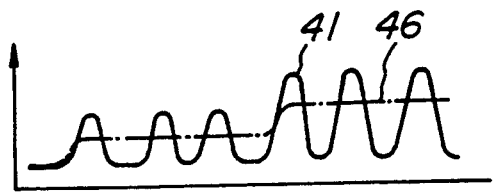
FIGS. 7A to 7C are signal waveforms for explaining the operation of the apparatus depicted in FIG. 6.
Figure 7B:
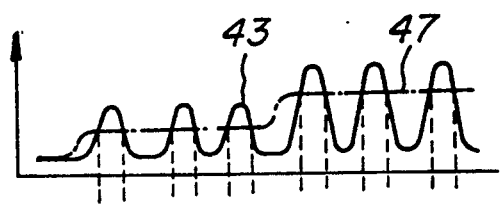
Figure 7C:

In the present embodiment, the average value of the sub-reproduced signal 41 is detected by the average value detector 36 to produce the average value signal 46 as illustrated in FIG. 7A. Then the amplitude and offset of the average value signal 46 are suitably adjusted by the limiter 35 to derive the threshold signal 47, and then the main reproduced signal 43 is compared with the threshold signal 47 as depicted in FIG. 7B to derive the bivalent signal 45 shown in FIG. 7C. Also in the present embodiment, the bivalent signal 45 represents the bit "1" of the original digital information faithfully.

As explained above, by detecting the average value of the sub-reproduced signal and setting the threshold signal for the main reproduced signal in accordance with the average value, it is possible to obtain the bivalent signal correctly without being influenced by the variation of the level of the reproduced signal due to various external factors.

In the present invention the main and sub-reading light beams have to be projected onto the same track of the optical record medium simultaneously. This may be carried out by various means. For instance, the main and sub-reading light beams may be generated by separate light sources and optical systems.

Figure 8:
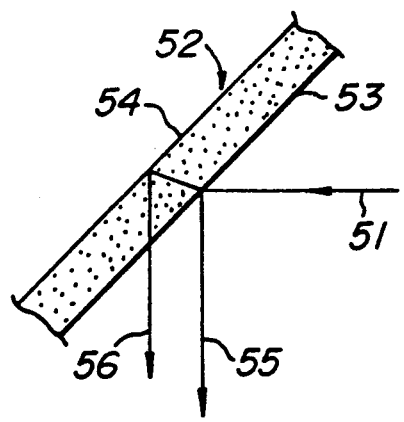
FIG. 8 is a schematic view showing an embodiment of a means for projecting the main and sub-light beams in the apparatus according to the invention.

FIG. 8 shows the construction of the means for generating the main and sub-light beams in a simple manner. In this embodiment a single light beam 51 is made incident upon a plane parallel glass plate 52 at an incident angle of substantially 45 degrees. A part of the incident light beam 51 is reflected by a front surface 53 to produce a main light beam 55, and a remaining part of the incident light beam is transmitted through the front surface 53 and is made incident upon a rear surface 54. Then a part of the incident light beam is reflected by the rear surface 54 to form a sub-light beam 56. In this manner it is possible to produce the main and sub-light beams 55 and 56 which are parallel with each other.

It should be noted that when the threshold signal is derived in accordance with the peak value of the sub-reproduced signal as in the first embodiment, the distance 1 between the main and sub-reading light beam spots is preferably set to a value smaller than the minimum bit distance. When the threshold signal is derived on the basis of the average value of the sub-reproduced signal as in the case of the second embodiment, the distance 1 is preferably set to be wider than the minimum bit distance.

As explained above in detail, according to the present invention, the main and sub-reading light beams are projected on the same track of the optical record medium such that the sub-reading light spot is situated forwardly with respect to the main reading light spot to derive the main and sub-reproduced signals. Then the threshold signal is derived by processing the sub-reproduced signal, and the main reproduced signal is converted into the bivalent signal by using the threshold signal as the reference signal. Since the level of the threshold signal changes in accordance with the variation of the level of the main reproduced signal, it is always possible to derive the bivalent signal faithfully although the level of the main reproduced signal varies due to various extraneous factors.

The present invention is not limited to the embodiments just explained above, but many modifications and alternations may be conceived by those skilled in the art within the scope of the invention.

What is claimed is:

1. An apparatus for reading digital information recorded on a track in an optical record medium as discrete record portions, comprising:

light projecting means for projecting on the optical record medium a main reading light beam and a sub-reading light beam, said sub-reading light beam being situated on the same digital information track on the optical record medium as that on which said main reading light beam is situated, but being shifted forwardly with respect to the main reading light beam relative to a scanning direction;

photoelectric converting means for receiving the main reading light beam reflected from the optical record medium to generate a main reproduced signal and receiving the sub-reading light beam to produce a sub-reproduced signal;

threshold signal producing means for receiving the sub-reproduced signal to derive a threshold signal which is varied in accordance with the sub-reproduced signal; and signal converting means for converting the main reproduced signal into a bivalent signal representing the digital information recorded on the tracks by using the threshold signal as a reference signal.

2. An apparatus according to claim 1, wherein said signal converting means comprises a voltage comparator having a first input terminal for receiving said main reproduced signal, a second input terminal for receiving said threshold signal, and an output terminal for generating said bivalent signal.

3. An apparatus according to claim 2, wherein said threshold signal generating means comprises a peak detector for detecting and holding peaks of the sub-reproduced signal to derive a peak signal, and a limiter for adjusting amplitude and offset of said peak signal to derive said threshold signal.

4. An apparatus according to claim 3, wherein said light projecting means is constructed such that a distance between the main and sub-reading light beams on the optical record medium is smaller than the minimum distance between successive record portions relative to a track direction.

5. An apparatus according to claim 2, wherein said threshold signal generating means comprises an average value detector for detecting an average value of the sub-reproduced signal to derive an average value signal, and a limiter for adjusting amplitude and offset of the average value signal to derive said threshold signal.

6. An apparatus according to claim 5, wherein said light projecting means is constructed such that a distance between the main and sub-reading light beams on the optical record medium is larger than the minimum distance between successive record portions relative to a track direction.

7. An apparatus according to claim 1, wherein said light projecting means comprises a light source for emitting a single light beam, and a plane parallel glass plate which is arranged obliquely with respect to said single light beam and has a front surface for reflecting a part of said single light beam to generate the main reading light beam and a rear surface for reflecting a part of light beam transmitted through the front surface to generate the sub-reading light beam.

\* \* \* \* \*

UNITED STATES PATENT AND TRADEMARK OFFICE
CERTIFICATE OF CORRECTION

PATENT NO. : 5,105,417
DATED : April 14, 1992
INVENTOR(S) : Akira MATSUEDA et al It is certified that error appears in the above-identified patent and that said Letters Patent is hereby corrected as shown below:

Column 5, lines 40-43, the entire three lines of text should be moved so as to appear at column 6, between lines 13 and 14.

Signed and Sealed this

Twenty-eighth Day of September, 1993

Attest:

BRUCE LEHMAN

*Attesting Officer*  *Commissioner of Patents and Trademarks*